United States Patent [19]

Geisler

[11] Patent Number: 5,287,630
[45] Date of Patent: Feb. 22, 1994

[54] DISTANCE OR POSITION DETECTING DEVICE

[75] Inventor: Peter Geisler, Darmstadt, Fed. Rep. of Germany

[73] Assignee: Hottinger Baldwin Messtechnik GmbH, Darmstadt, Fed. Rep. of Germany

[21] Appl. No.: 753,803

[22] Filed: Sep. 3, 1991

[30] Foreign Application Priority Data

Sep. 3, 1990 [EP] European Pat. Off. ........ 90116865.8

[51] Int. Cl.⁵ .................... G01B 7/02; G01B 11/02
[52] U.S. Cl. ........................... 33/706; 33/707; 33/708
[58] Field of Search .................... 33/706, 707, 708; 250/231.14, 237 G

[56] References Cited

U.S. PATENT DOCUMENTS

| | | | |
|---|---|---|---|
| 2,788,519 | 4/1957 | Caldwell | 33/708 |
| 2,797,614 | 7/1957 | Heidenhain | 33/707 |
| 2,808,650 | 10/1957 | Kumagai | 33/708 |
| 3,237,189 | 2/1966 | Wayman . | |
| 4,297,698 | 10/1981 | Pauwels et al. . | |
| 4,483,077 | 11/1984 | Matsumoto et al. | 33/707 |
| 4,714,349 | 12/1987 | Huber | 33/707 |
| 4,786,891 | 11/1988 | Ueda et al. | 33/707 |
| 4,793,067 | 12/1988 | Reimal et al. | 33/707 |
| 5,038,491 | 8/1991 | Tsukiji et al. | 33/707 |
| 5,062,214 | 11/1991 | Gustafsson et al. | 33/707 |
| 5,069,547 | 12/1991 | Huggins et al. | 33/707 |

FOREIGN PATENT DOCUMENTS

| | | |
|---|---|---|
| 0028971 | 5/1981 | European Pat. Off. . |
| 0039921 | 11/1981 | European Pat. Off. . |
| 0078892 | 5/1983 | European Pat. Off. . |
| 3014137 | 10/1981 | Fed. Rep. of Germany . |
| 3235033 | 3/1984 | Fed. Rep. of Germany . |
| 3436681 | 5/1985 | Fed. Rep. of Germany ........ 33/706 |
| 3205032 | 3/1986 | Fed. Rep. of Germany . |
| 3711062 | 10/1988 | Fed. Rep. of Germany . |
| 0161001 | 7/1987 | Japan ................................ 33/708 |
| 0071611 | 4/1988 | Japan ................................ 33/706 |
| 0302101 | 12/1989 | Japan ................................ 33/708 |
| 0575655 | 10/1977 | U.S.S.R. .......................... 33/706 |
| 2213941 | 8/1989 | United Kingdom ................. 33/708 |

OTHER PUBLICATIONS

Japanese Patent Abstracts, vol. 10, No.: 190, (p. 474), Jul. 4, 1986, 61-35308, Omron Tateisi Electronics Co, Inventor: Hitoshi Naito.

Article Entitled: "Absolute-Type Position Transducers Using a Pseudorandum Encoding", by Emil M. Petriu; 8096 I.E.E.E. Transactions on Instrumentation & Measurement, IM-36 (1987) Dec., No. 4, N.Y. USA, pp. 950-955.

*Primary Examiner*—Thomas B. Will
*Attorney, Agent, or Firm*—W. G. Fasse

[57] ABSTRACT

A distance or position detecting device has a movable member forming a measuring ruler and a detector in the form of a primary coil and a plurality of secondary coils forming together a stationary member. The measuring ruler is movable coaxially inside a hollow core of the primary coil. The measuring ruler is made of a plurality of sections alternating with one another along the length of the ruler, whereby these sections have different discernible characteristics, for example, magnetic characteristics and nonmagnetic characteristics. The individual ruler sections are assembled along the length of the ruler in such a manner that a respective limited number of neighboring ruler sections are arranged in an encoded form so that the encoding provides an absolute position indication. Such a structure is simple and hence cost effective in any of its operational states. An accurate and absolute position indication is thus possible.

16 Claims, 7 Drawing Sheets

DISTANCE OR POSITION DETECTING DEVICE

FIELD OF THE INVENTION

The invention relates to a distance or position detecting device such as an inductive transducer for measuring the distance travelled, for example, by a tool relative to a work piece, whereby a ruler constituting a movable member moves through a detector constituting a stationary member or vice versa. The ruler includes sections arranged in a row and having discernible characteristics.

BACKGROUND INFORMATION

German Patent Publication (DE) 3,205,032 discloses a position detector of the type described above, whereby the ruler is constructed of a plurality of sections, including magnetic sections and nonmagnetic sections, whereby all the sections have the same length. These sections are arranged in alternate fashion along the length of the ruler, one behind the other. The ruler moves relative to a sensor coil or winding, thereby inducing in the coil or winding respective signals. The known device is merely suitable for ascertaining the relative position of a magnetic ruler section within the sensor coil. As a result, larger distances can be measured only in incremental fashion or it is possible to arrange two such devices in parallel, one of which has a ruler with sections that provide a coarser subdivision, in other words, the sections are longer than the ruler sections in the other detector. Another disadvantage of these known magnetically absolute measuring detectors is seen in that they are rather bulky relative to the maximally measurable length. Still another drawback of conventional measuring devices of this type is seen in that they must always be calibrated again when they are placed in operation to eliminate the measuring error, or at least reduce the measuring error of these devices. The recalibration is necessary because there is no fixed relationship between the movable member and the stationary member of the conventional device, i.e. there is no embodiment of a measure.

It is also generally known to encode distance information in a detector as, for example, disclosed in European Patent Publication 0,078,892 (Schmitt).

OBJECTS OF THE INVENTION

In view of the foregoing it is the aim of the invention to achieve the following objects singly or in combination:

- to permit a precise, absolute measuring of relatively long distances or respectively provide a precise position information of a movable member relative to a stationary member;
- to provide a distance and position information detecting device that requires but one ruler and permits a short structural length of the detector device; and
- to construct such a detector so that it facilitates a digital signal processing in a coded form.

SUMMARY OF THE INVENTION

The invention is characterized in that the measuring ruler is assembled of a plurality of sections having different characteristics in such a manner that along the entire rule groups of neighboring ruler sections provide in coded form an absolute position information, whereby each group of neighboring ruler sections comprises a limited number of ruler sections.

It is preferable that the number of different characteristics of these sections is only two, thereby assuring a simple signal processing. Such characteristics may, for example, be a magnetic characteristic and a nonmagnetic characteristic. Such an embodiment is especially suitable for a digital signal processing because the encoded information detected from the ruler sections is already in accordance with the binary notation. Further, since the measuring ruler itself embodies a measure, namely a measuring scale, it is no longer necessary to perform time and effort consuming calibrations.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
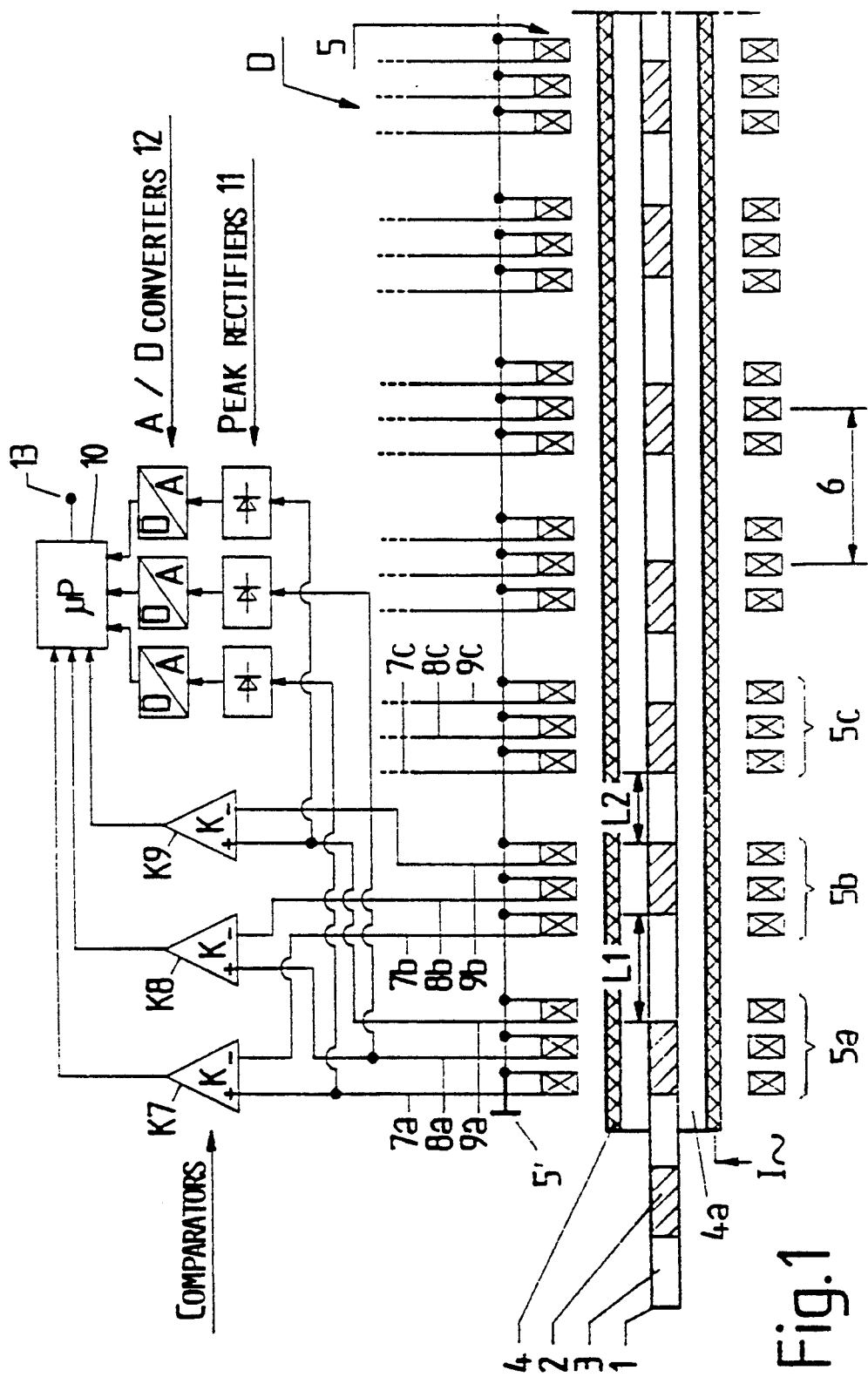
FIG. 1 shows a detecting device according to the invention in combination with a block circuit diagram for the signal evaluation.

Referring first to FIG. 1, the present distance or position detecting device comprises a measuring ruler 1 constituting a movable member consisting of a single row of a plurality of sections 2 of magnetic material and sections 3 of nonmagnetic material arranged in a single row in an alternating fashion along the length of the ruler so that a magnetic section 2 alternates with a nonmagnetic section 3. The ruler 1 is longitudinally movable within a hollow core 4a of a detector D comprising a primary coil 4 surrounding the hollow core 4a, and a plurality of groups 5 of secondary coils connected to a common ground 5'. Each group 5a, 5b, 5c and so forth comprises three individual secondary coils. The primary coil 4 surrounds the ruler 1 coaxially. The secondary coils in turn surround the primary coil coaxially. The on-center spacing 6 between two neighboring secondary coil groups is always the same along the entire length of the device. The detector D with its primary and secondary coils forms a stationary member. As mentioned, the magnetic sections 2 of the ruler 1 alternate with the nonmagnetic sections 3 of the ruler. The magnetic sections 2 all have the same length while the nonmagnetic sections 3 have two different lengths L1 and L2. The mentioned on-center spacing 6 between neighboring secondary coil groups is determined by the period or cycle length of the ruler 1. Stated differently, the spacing 6 corresponds to the sum of the length of a magnetic section 2 and the average or mean length of the nonmagnetic sections 3.

The primary coil 4 is energized by a primary input voltage indicated at I, whereby voltages are induced in the secondary coils. The amplitudes of the induced voltages appearing at the output terminals of the individual secondary coils depends on the geometric relationships between the primary coil and the secondary coil groups and is substantially determined by the permeability of the coil cores. As will be described in more detail below, analysis of the induced voltage signals in the secondary coils 5 makes it possible to detect which sequences of long and short nonmagnetic sections 3 are within the hollow core 4a.

The individual nonmagnetic sections 3 of the ruler 1 are arranged in accordance with the principle of pseudo-random functions so that a determined combination of neighboring nonmagnetic ruler sections 3 occurs only once along the entire ruler length. The combination as such is known, so that a coarse, yet definite position determination is possible. Incidentally, in this context the term "neighboring non-magnetic ruler section" means two sections 3 that are separated by one magnetic ruler section 2.

The circuit arrangement and the signal processing for the signal evaluation will now be described with reference to the example of two neighboring secondary coil groups 5a and 5b.

Figure 2:
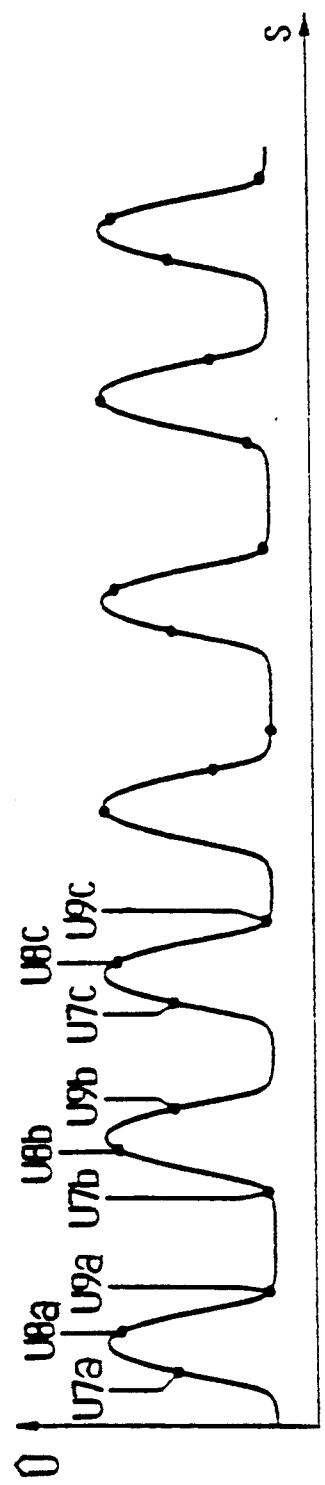
FIG. 2 shows the voltage amplitudes of secondary coil outputs of the present device as a function of the relative position of the ruler within a primary coil of the hollow detector.

When the ruler 1 is in the position shown in FIG. 1, the voltage applied to the primary coil 4 induces in the secondary coils 5 a voltage characteristic, the amplitudes of which are shown in FIG. 2 as a function of the coil location relative to the ruler 1. The amplitude characteristic within any one secondary coil depends thus on the instantaneous position of the magnetic section 2 relative to that coil. The output terminals of the individual secondary coils are connected through conductors 7a, 7b, 7c, 8a, 8b, 8c, 9a, 9b, 9c, and so forth to an input of a respective comparator K. For example, one input of the comparator K7 is connected to the first coil of the group 5a while the other input of the comparator K7 is connected to the first coil of the group 5b. The other terminal of each of the secondary coils is grounded at 5'. The output of the comparators K7, K8, K9, and so forth are connected to respective inputs of a microprocessor 10. Three peak rectifiers 11 are connected as shown, whereby the inputs of each peak rectifier is connected to its respective secondary output coil terminal and the outputs of the peak rectifiers are connected through analog-to-digital converters 12 to respective inputs of the microprocessor 10. The peak rectifiers 11 determine the amplitude of the three voltages U7a, U8a, and U9a, of the coil output 7a, 8a, and 9a. A position information signal is provided at the output terminal 13 of the microprocessor 10. The position information is processed to provide the respective signal as follows.

First, the voltage amplitudes U7a, U8a, and U9a which are induced in the secondary coil group 5a and which are available on the conductors 7a, 8a, and 9a, are measured. A simple comparing calculation of these voltages permits the conclusion which voltage value represents an amplitude flank of the voltage curve having an approximately Gaussian configuration. Further, it is possible to calculate whether the respective value is located on the left or on the right flank of an amplitude. The thus ascertained voltage values U7a, U8a and U9a are supplied through the respective conductor 7a, 8a, 9a to the corresponding comparators K7, K8, and K9. As shown in FIG. 1, the first voltage U7a is supplied to the comparator K7. Further, the voltage U7b is also supplied to the first comparator K7.

Figure 3:
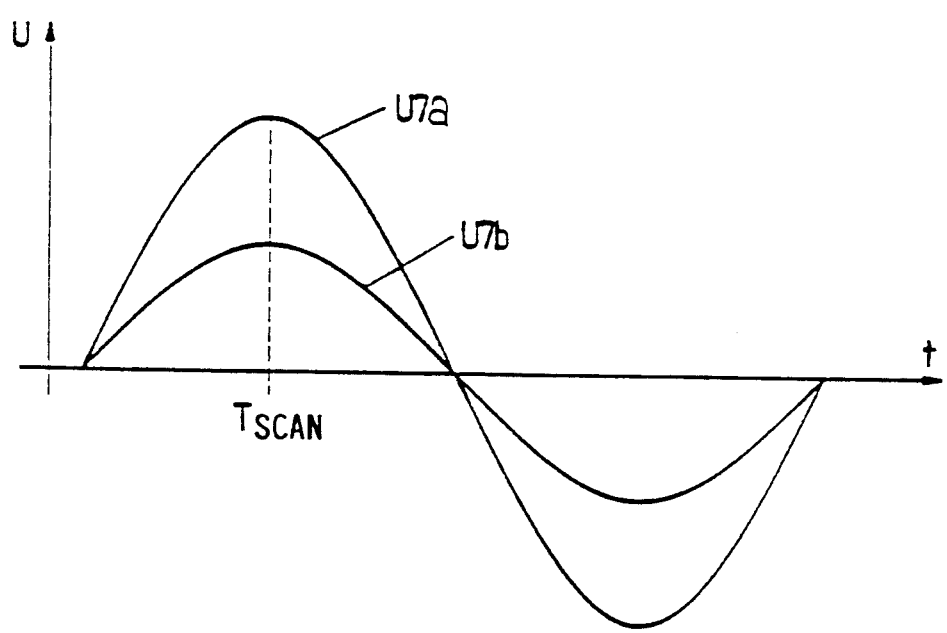
FIG. 3 shows voltage curves of two voltages supplied, for example, to the input of a comparator, as a function of time.

The two voltages U7a and U7b are shown in FIG. 3 as a function of time. The scanning time $T_a$ is shown, e.g. at the amplitude peak. If U7a at the scanning time $T_a$ is larger than U7b, a high voltage level appears at this point of time. This high voltage level corresponds to a long, nonmagnetic ruler section 3 between the magnetic sections 2 which are located in the secondary coil groups 5a and 5b. If U7a at the scanning time $T_a$ is smaller than U7b, a low voltage level is registered, indicating the presence of a short non-magnetic section 3 between the two neighboring secondary coil groups.

With the information thus obtained with the aid of the comparators K on the basis of the nonmagnetic sections located between the two neighboring secondary coil groups 5a and 5b and based on the voltage amplitude shown in FIG. 2, the conclusion can be made that the voltage amplitude value Ub of the secondary coil group 5b is located on a right-hand flank in FIG. 2. For this purpose no voltage value must appear on the conductor 7b, 8b, 9b from the secondary coil group 5b.

In order to determine the length of the nonmagnetic section between the secondary coil group 5b and the secondary coil group 5c, a further comparator, not shown, compares the voltage amplitude value U9b with the voltage amplitude value U9c appearing on the conductor 9c. Since the voltage amplitude value U9b is located on the right-hand flank of the respective curve, it is necessary to invert the output signal of the respective comparator which is not shown. If the voltage value U9c of the Example is smaller than the voltage value U9b, it can be concluded that between the secondary coils 5b and 5c there is located a short nonmagnetic section 3. On the other hand, if a long magnetic section were present between the coil groups 5b and 5c, the voltage U9c would be larger than the voltage U9b. The evaluation of the further length of the measuring ruler 1 as represented by the nonmagnetic sections 3 takes place in the same manner as described above. In the shown example there are four more nonmagnetic sections in the measuring ruler 1.

Based on the information obtained as described above, which information is represented by 6 bits, the micro-processor is capable of determining a coarse position. For a fine position determination, a voltage amplitude value U7a, U8a, or U9a is used, whereby it is possible to provide a very precise position of the ruler 1 relative to the stationary primary and secondary coils. The previously obtained rough position determination is them improved by the following fine positioning determination. Thus, very few electrical structural components make it possible to determine the position of the movable measuring ruler 1 relative to the detector coil structure 5.

The detector coil structure 5 may be easily realized in that the individual coils of the secondary coil groups 5a, 5b, 5c and so forth and/or the conductors 7, 8, and 9, as well as the comparator circuits K are provided in the form of a foil-type printed circuit which is then wound around the primary coil 4. Such a construction is especially simple and reduces accordingly the manufacturing costs.

Figure 4:
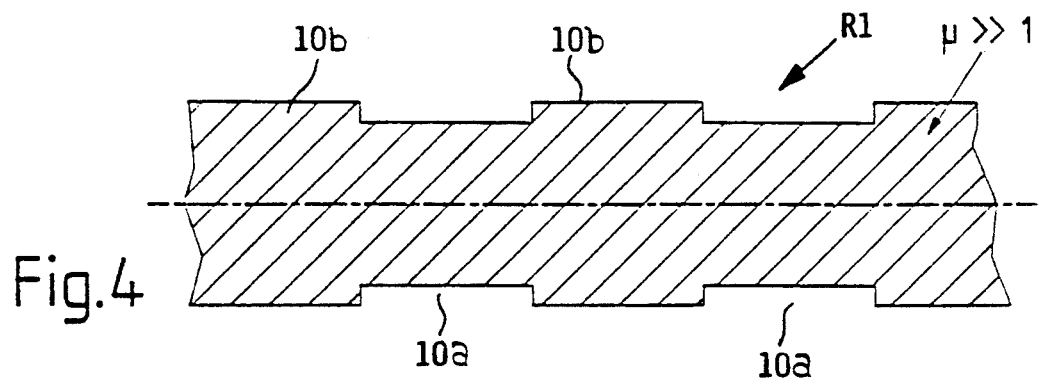
FIGS. 4 to 6 show different constructions of the present measuring ruler.

FIG. 4 shows a measuring ruler R1 made of ferromagnetic material having a permeability $\mu$ substantially larger than one. The ruler R1 has recesses or ring grooves 10a therein spaced by ferromagnetic magnetic lands 10b so that said recesses form one characteristic while said lands form the other characteristic of the ruler R1. The hollow detector for cooperation with the ruler R1 again comprises primary and secondary coils as described above. The axial lengths of these ring grooves 10a and lands 10b will vary along the length of the ruler as described above.

Figure 5:
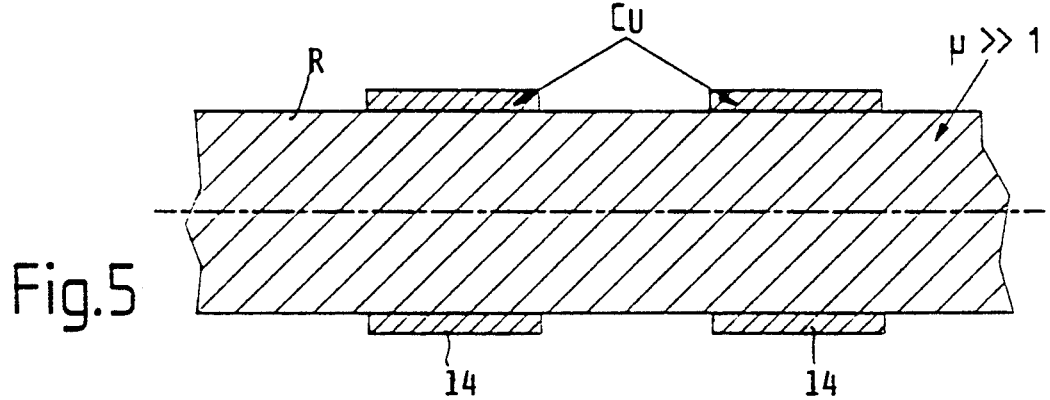

FIG. 5 shows a measuring ruler R2 provided with electrically conducting short-circuit rings 14, for example made of copper, and spaced from one another with different spacings along the length of the ruler R2.

Figure 6:
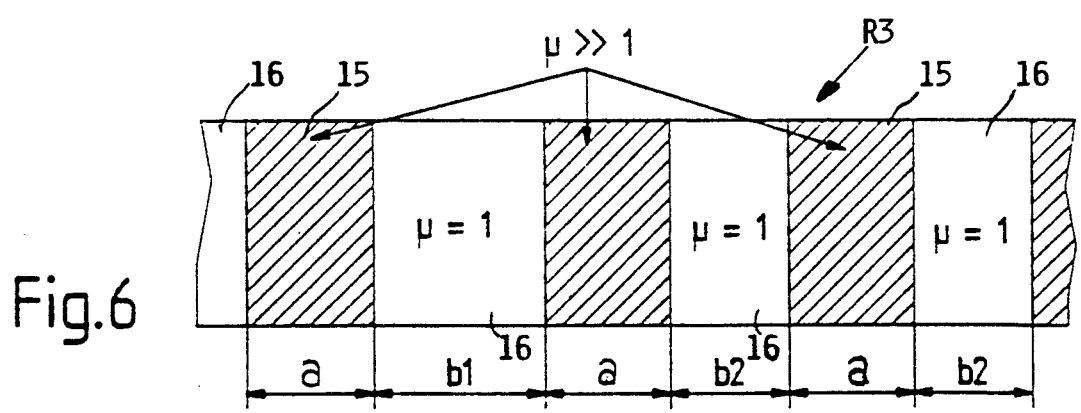

FIG. 6 shows a measuring ruler R3 comprising magnetizable sections 15 and nonmagnetizable sections 16 alternating with each other along the length of measuring ruler R3. The sections 15 have all the same length a, while the sections 16 have different lengths b1, b2. The sections 15 could also be permanent magnetic sections while the sections 16 are nonmagnetic sections alternating with each other along the length of the measuring ruler R3.

Figure 7:
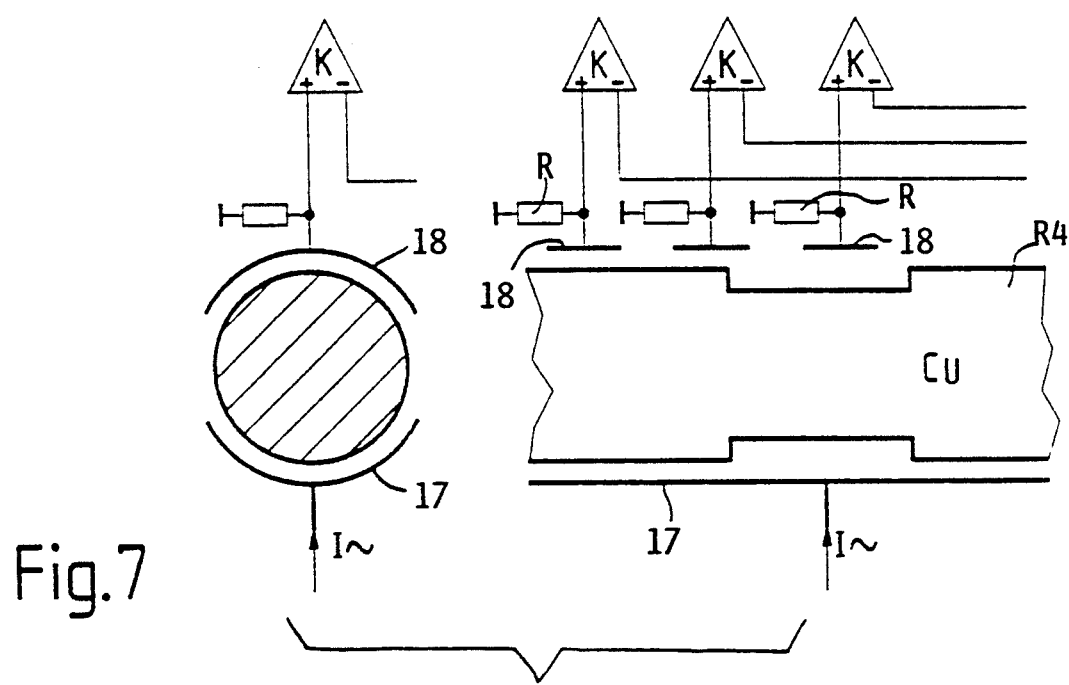
FIG. 7 shows a ruler capacitive detector means.

FIG. 7 shows an embodiment wherein the detector comprises capacitive detector elements for detecting different voltage values. These detector elements include a main electrode 17 connected to an alternating current source I, and a plurality of secondary electrodes 18 each connected to ground through a respective resistor R. A ruler R4 is made of copper in the same shape as shown in FIG. 4. The sensor circuit senses different capacities which are determined by the extent to which the ruler R4 dips into the arrangement of electrodes 17, 18.

Figure 8:
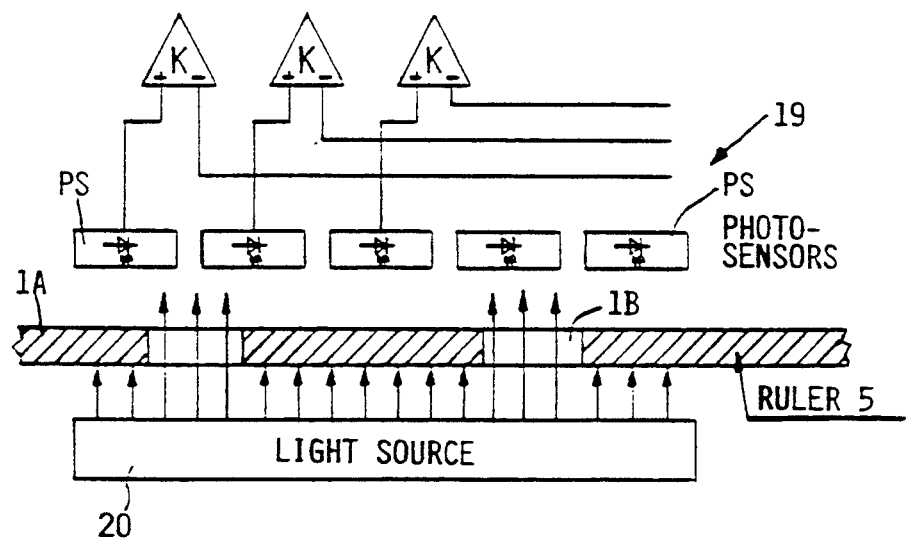
FIG. 8 shows a perforated ruler with an optical detector.

FIG. 8 shows another embodiment and a ruler R5 with a detector 19 comprising a plurality of optical scanning elements such as photosensors PS for detecting different voltage values. For this purpose the ruler R5 has sections 1A which are opaque and light sections 1B which are light transparent. The lengths of these sections 1A and 1B again differ along the length of the ruler R5. The photosensors PS are so arranged relative to a light source 20 that they will receive through the light permeable sections 1B different light quantities or no light at all through the opaque sections 1A depending on the extent to which the ruler R5 dips into the space between an elongated light source 20 and the photosensors PS.

Figure 9:
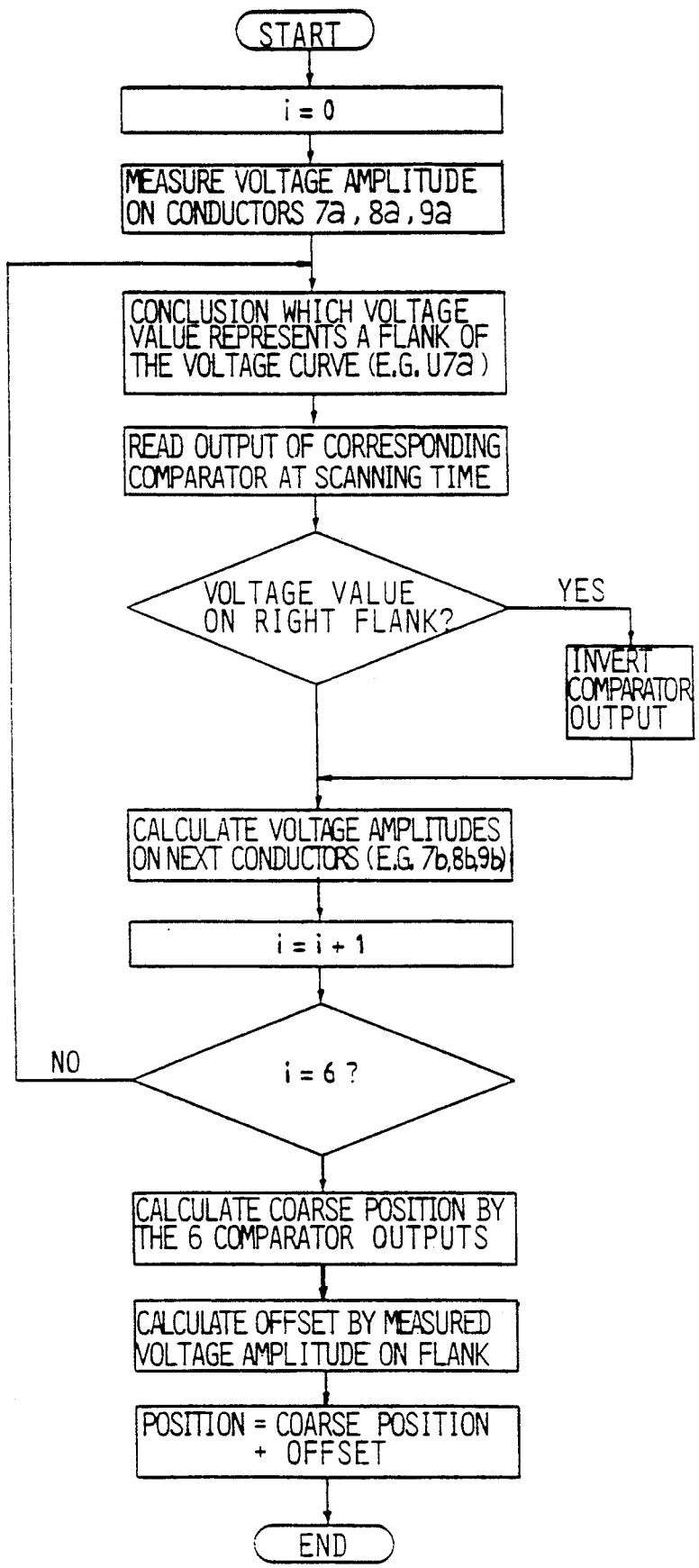
FIG. 9 is a flow diagram illustrating the function of the present device.

FIG. 9 is a flow diagram illustrating the operation of the present device. The labels of FIG. 9 are self-explanatory and the function of the device will now be additionally described with reference to FIG. 9.

An example of a 6-bit embodiment will be described with reference to the microprocessor 10. First, a counter is set to zero. Then, the voltage amplitudes on the conductors 7a, 8a, and 9a of the secondary coil 5a are measured. These measured voltage values are evaluated to determine which amplitude value represents a curve flank. The respective comparator signal, for example comparator K7 is read out and a conclusion is made, as described above with reference to FIGS. 1 and 2, whether the voltage value relates to a left curve flank or to a right curve flank. If the signal relates to a right flank, then the comparator signal is inverted. When the voltages U7a, U8a and U9a and the comparator signal from K7, which in this example is a "high signal", it is possible to calculate the voltage amplitudes on the three conductors 7b, 8b, and 9b of the next secondary coil. Next, the counter is moved one step. During the next operational sequence of this program loop, a conclusion is made, which of the voltage values U7b, U8b, and U9b relates to a flank.

After completion of six passages through the program loop, the six signals necessary and suitable for a coarse determination of the absolution position of the ruler 1, have been read into the counter. Now it is possible to calculate the fine position of the ruler 1 with the value on a curve flank, in this example the value U7a. This fine ruler position in combination with the coarse position provides the exact, absolute position of the ruler, whereby a measuring operation is completed and the respective value may be displayed on a display, e.g. a digital display not shown, but connected to the output terminal 13 of the microprocessor 10.

Although the invention has been described with reference to specific example embodiments, it will be appreciated that it intended to cover all modifications and equivalents within the scope of the appended claims.

What I claim is:

1. A distance and position detecting device for providing a position information signal representing a distance or a position of a movable member relative to a stationary member, comprising hollow detector means forming said stationary member for detecting position information, said movable member consisting of a single movable measuring ruler which is movable into and out of said hollow detector means for generating said position information in said hollow detector means, said single movable measuring ruler consisting of a single row of ruler sections along its length having discernible different characteristics along said length of said single movable measuring ruler, so that said different characteristics of a limited number of neighboring ruler sections together provide an encoding which represents said position information signal in the form of an absolute position indication, whereby said movable measuring ruler itself is a measuring scale for an absolute measurement without any reference marker.

2. The device of claim 1, wherein said single row of ruler sections have two different characteristics that can be discerned for digital signal processing.

3. The device of claim 1, wherein said single row of ruler sections of different characteristics are arranged in such a sequence relative to each other along said measuring ruler that pseudo-random sequences constitute said encoding.

4. The device of claim 1, wherein said hollow detector means comprise a primary coil (4) having a hollow core in which said measuring ruler is coaxially movable and a plurality of secondary coils (5) surrounding said primary coil (4), and wherein said single row of ruler sections (2, 3) comprise magnetic sections (2) and nonmagnetic sections (3) forming said different characteristics alternating with each other in said single row of ruler sections.

5. The device of claim 1, wherein said measuring ruler is made of ferromagnetic material and comprises recesses therein spaced by ferromagnetic magnetic lands so that said recesses form one characteristic while said lands form the other characteristic, said recesses and lands forming said single row of ruler sections, and wherein said hollow detector means comprise primary and secondary coils.

6. The device of claim 5, wherein said recesses comprise ring grooves spaced from each other by said lands to form said single row of ruler sections.

7. The device of claim 1, wherein said measuring ruler comprises electrically conducting short-circuit rings arranged in said single row of ruler sections along said measuring ruler.

8. The device of claim 1, wherein said measuring ruler comprises magnetizable sections and nonmagnetizable sections alternating with each other along said single row of ruler sections of said measuring ruler.

9. The device of claim 1, wherein said measuring ruler comprises permanent magnetic sections and nonmagnetic sections alternating with each other along said single row of ruler sections of said measuring ruler.

10. The device of claim 1, wherein said measuring ruler comprises first sections having one magnetic characteristic and second sections having another magnetic characteristic, and wherein each of said first sections (2) has the same length along said single row of ruler sections of said measuring ruler, and wherein said second sections have at least two different lengths along said single row of ruler sections.

11. The device of claim 1, wherein said detector means comprise a coil arrangement including a primary coil connected to an alternating current voltage source and a plurality of axially arranged secondary coils, and wherein a voltage induced in the secondary coils is connected to a signal evaluating circuit arrangement.

12. The device according to claim 1, wherein said detector means comprise capacitive detector means for detecting different voltage values.

13. The device of claim 1, wherein the detector means comprise optical scanning means for detecting different voltage values.

14. The device of claim 13, wherein said measuring ruler has opaque sections and light transparent sections alternating with each other along said single row of ruler sections of said ruler, said hollow detector means comprising an elongated light source and photosensors arranged alongside each other to form a space into which the ruler can dip.

15. A distance and position detecting device for providing a position information signal representing a distance or a position of a movable member relative to a stationary member, comprising light detector means forming said stationary member for detecting position information, light source means arranged alongside said light detector means with a spacing, said movable member consisting of a single movable measuring ruler which is movable into and out of said spacing for generating said position information in said detector means, said single movable measuring ruler consisting of a single row of opaque ruler sections (1A) and of light transparent ruler sections (1B) along its length thereby providing discernible different characteristics along said length of said measuring ruler, so that said different characteristics of a limited number of neighboring ruler sections together provide an encoding which represents said position information signal in the form of an absolute position indication, whereby said movable measuring ruler itself is a measuring scale for an absolute measurement without any separate reference marker.

16. The device of claim 15, wherein said ruler sections (1A and 1B) have lengths that differ along the length of said ruler thereby forming said discernible different characteristics.

* * * * *